Figure 1:
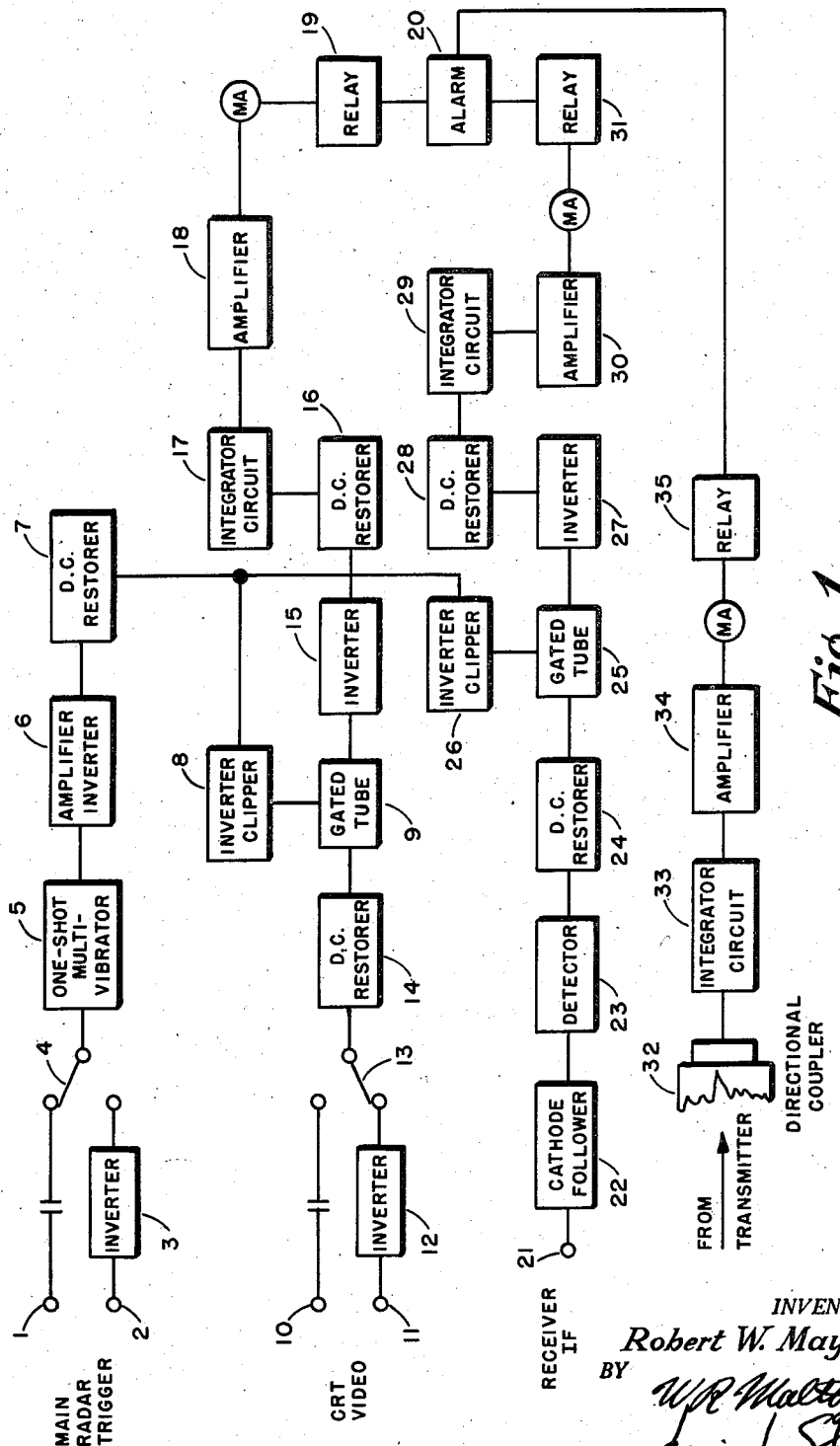

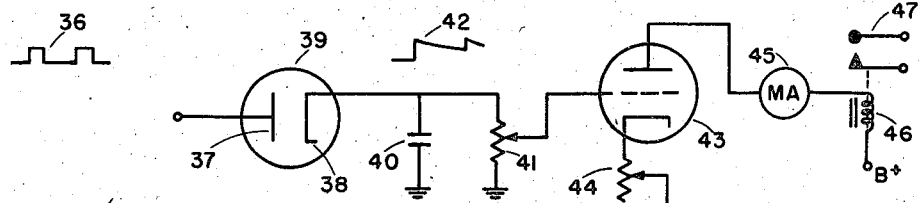
Fig. 2
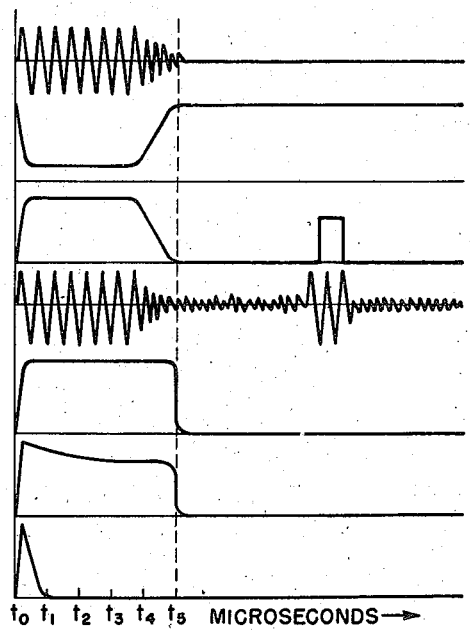
Fig. 3
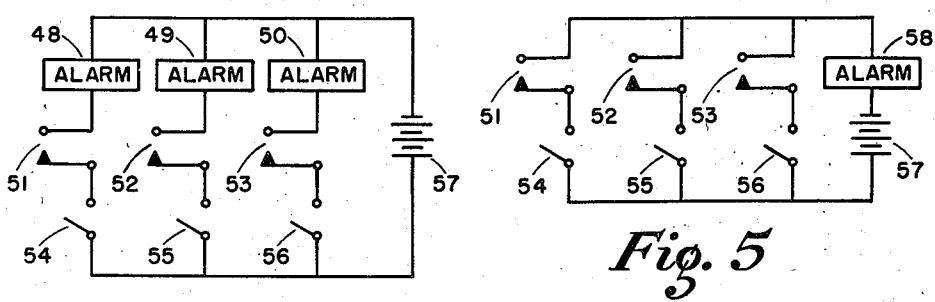
Fig. 4
Fig. 5
INVENTOR.
Robert W. Maynard

United States Patent Office 2,854,663
Patented Sept. 30, 1958

2,854,663

RADAR FAILURE ALARM

Robert W. Maynard, Lexington, Mass.

Application May 11, 1955, Serial No. 507,752

2 Claims. (Cl. 343—17.7)

(Granted under Title 35, U. S. Code (1952), sec. 266)

The invention described herein may be manufactured and used by or for the Government of the United States of America for governmental purposes without the payment of any royalties thereon or therefor.

This invention relates to electronic warning systems and in particular to an alarm system for use with radio ranging and detecting apparatus.

In some uses of radar it is essential that a continuous surveillance of an area or volume of space be maintained. For a particular radar set and object the maximum range of detection depends upon the energy of each transmitted pulse, on the minimum detectable echo-pulse energy, on the effective area of the antenna relative to the square of the wave length, and on the radar cross section of the object. The minimum detectable echo-pulse energy depends mainly on the quality of the receiver input circuits and to a smaller extent on the over-all bandwidth of the receiver, on the pulse repetition frequency, and on the number of pulses returned from the object as the antenna beam scans past it. Some of the factors determining the maximum range of detection are normally fixed, such as the effective area of the antenna and the transmitted wave length; other of the factors, such as the radar cross section of the object are normally not within the control of the radar operator. It is desired, therefore, that where the maximum range of the radar set is reduced to an extent where the area to be surveyed cannot be effectively covered due to a decrease in transmitter power or in receiver sensitivity that the operator be immediately apprised of the situation.

Many methods of measuring power utilizing echo boxes, power meters, and synchroscopes have been devised in the past to give either relative or absolute values of radar efficiency. The apparatus connected with those methods usually are manually operated, require a degree of training to be successfully operated and do not provide an automatic warning of radar inefficiency or failure. Usually those methods are employed at intervals to test the efficiency of a radar set and are not suitable for continuous monitoring of the set.

It is an object of this invention to provide an automatic alarm system for radar which functions under all conditions to give visual and audible warning when the radar set is inoperative or functioning below certain relative levels of efficiency.

It is a further object of the invention to provide a radar failure alarm system which is capable of indicating whether the cause of radar failure or inefficiency is in the transmitter, the I. F. section of the receiver, or in the video section.

Another object of the invention is to provide a radar failure alarm system which is capable of giving a visual or audible warning when the alarm system fails, its efficiency is sufficiently reduced or when power to the alarm system is interrupted.

This invention may also be adapted for monitoring of systems other than radar, such as radio or television transmitters and receivers which are to be operated for extensive periods of time.

Other objects and many of the attendant advantages of this invention will be readily appreciated as the same becomes better understood by reference to the following detailed description when considered in connection with the accompanying drawings wherein:

Fig. 1 is a block diagram of an embodiment of the invention;

Fig. 2 schematically illustrates a type of power sensitive relay circuit which may be employed in this invention;

Fig. 3 discloses graphs of certain wave forms and the sequence of their occurrence; and Figs. 4 and 5 depict alternate schemes of employing alarm means in the warning system.

Referring now to Fig. 1 wherein there is shown a schematic block diagram of the invention, a radar trigger pulse taken from the timer section or any other convenient location in the radar set is applied at either terminal 1 or 2 depending upon the positive or negative nature of the pulse. Where the trigger pulse is positive it is applied at terminal 1, where the trigger pulse is negative it is applied at terminal 2 and is subsequently reversed in phase by the inverter 3. A switch 4 is provided so that the appropriate input terminal to the multivibrator 5 may be selected. The positive radar trigger pulse is then fed to "one-shot" multivibrator 5 and causes the multivibrator to generate a rectilinear output pulse. By the term "one-shot" multivibrator is meant a multivibrator having one equilibrium state and which will undergo a single complete cycle of operation each time that it is triggered from the equilibrium state. This type of multivibrator is well known in the art and is most frequently employed to generate rectangular voltage gates of specified duration, having the leading edge of the gate synchronized with a driving trigger voltage. When this type of multivibrator is used to produce a positive voltage gate, the output is generally taken from the plate of the normally conducting tube. The duration of the gate for the purpose of this invention should be equal to the duration of the radar transmitted pulse. Since the multivibrator output pulse generally does not have a satisfactory rectangular form, the output pulse is subsequently given the appropriate form by the amplifier 6, D. C. restorer 7, and clipper stages, 8 and 26 respectively, which follow the multivibrator 5. The properly shaped rectangular pulse obtained from the output of the inverter clipper 8 is used to gate tube 9.

Video signals taken from the radar receiver cathode ray tube input circuit are applied at either terminal 10 or terminal 11 depending upon the positive or negative nature of the C. R. T. video signals. Assuming then that the C. R. T. video signals are negative pulses, they are applied to terminal 11 and are reversed in phase by inverter 12. Switch 13 is set to the appropriate terminal and the positive pulses are fed to the D. C. restorer 14 where the pulses are restored to their proper D. C. level and then applied to the input grid of gated tube 9. Gated tube 9 is normally maintained in a blocked condition by suitable means, for example, biasing a multigrid tube to nonconduction, and is conditioned to pass signals from its input to its output circuit only when, for example, its screen grid is biased highly positive by the application thereto of a gating pulse from inverter clipper 8, hence gated tube 9 allows only the C. R. T. video signal derived from the transmitted pulse to be gated through it to the next stage. That video signal is passed through inverter 15 and D. C. restorer 16 and then fed to the input of integrator circuit 17. The output of integrator circuit 17 is used to control a power sensitive device comprising amplifier 18 and relay 19. The power sensitive device is pre-set to cause the relay contacts to close when the integrator circuit output derived from the video signals falls below a predetermined level. Therefore, if the video signal level drops below a predetermined value, the power sensitive device causes relay 19 to be deenergized sufficiently to cause its contacts to close whereupon an alarm 20 is actuated.

In radar receiver sets presently in use, the I. F. signals are generally "limited" or "cut off" in the stage preceding the second detector. Under some conditions the I. F. signals may drop in amplitude by about 20% without being noticed in the video signals. This result follows where the I. F. signals, though relatively weak, are still large enough to cause limiting and, hence would not produce an amplitude change in the video signals. Therefore, the C. R. T. video sample pulse may be misleading and provisions are made in this invention to sample the I. F. signals before they are limited.

The signals from the receiver I. F. section are taken from the stage preceding the limiting stage and are applied at terminal 21 as the input to cathode follower 22. The I. F. signals are rectified by the action of detector 23, the proper D. C. level is restored by D. C. restorer 24 and the signal is then applied to the grid of gated tube 25, which tube is normally in a blocked condition. A gating pulse from inverter clipper 26 is supplied to unblock gated tube 25, hence, the gate permits only the unlimited receiver I. F. signal pulse derived from the radar transmitted pulse to pass through the gated stage. The I. F. pulse which is gated through proceeds through the inverter 27 and D. C. restorer 28 and the signal is then applied to the input of integrator circuit 29. The output of the integrator circuit is used to control a second power sensitive device comprising amplifier 30 and relay 31. The second power sensitive device is similar to the first power sensitive device and is pre-set to cause relay 31 to close its contacts when the integrator circuit output falls below a predetermined level. Therefore, if the unlimited I. F. level drops below that predetermined level, the integrator circuit output decreases so that the amplifier 30 causes relay 31 to be deenergized sufficiently to cause the contacts to close whereupon an alarm 20 is actuated.

The portion of the invention thus far described is used principally to monitor the efficiency and operativeness of the radar receiver. It should be understood, however, that where the radar transmitter becomes inoperative or encounters a substantial loss in efficiency, the C. R. T. video and receiver I. F. levels will decrease causing the failure alarms of their associated monitoring circuits to be actuated.

In order to more directly monitor the efficiency of the radar transmitter, a directional coupler 32 is placed in the wave guide feeding the transmitting antenna. The radar pulse to be transmitted is then sampled by the directional coupler and the sample pulse is fed to the input of integrator circuit 33. The integrator circuit output is utilized to control a third power sensitive device, similar to the other two, comprising amplifier 34 and relay 35. The third power sensitive device is pre-set to cause the contacts of relay 35 to close when the output of integrator circuit 33 falls below a predetermined level whereupon an alarm 20 will be actuated.

The power sensitive relay circuit schematically illustrated in Fig. 2 will be described with reference to C. R. T. video pulses; however, it should be understood that the explanation by analogy may be extended to transmitter pulses and I. F. pulses. The power sensitive relay circuit comprises three successive portions of the invention which have in the block diagram of Fig. 1 been termed, "integrator circuit," "amplifier" and "relay." In the C. R. T. video section of the invention the power sensitive relay circuit includes integrator circuit 17, amplifier 18, and relay 19. Indicated at 36 in Fig. 2 are positive C. R. T. video pulses from the output of D. C. restorer 16 (Fig. 1). These video pulses, when impressed on the input side or plate 37 of diode detector 39, cause the diode to conduct thereby charging capacitor 40. During the period that the diode is nonconducting, the capacitor 40 discharges slowly through resistor 41. The wave form of the voltage across the resistor is shown at 42. The voltage thus impressed on the grid of tube 43 therefore will be a function of the repetition rate, amplitude, and width of the pulses applied to the input of detector 39.

In order to pre-set the power sensitive circuit to cause relay 47 to actuate an alarm when the C. R. T. video level drops below a predetermined value, the bias on the grid of amplifier 43 is adjusted while applying at a constant repetition rate to the input of detector 39 pulses having a constant amplitude and width. The grid bias is adjusted by means of variable resistor 41 until the relay 47 becomes energized and causes the contacts to open. The cathode bias is then adjusted until the current through relay winding 46, read on milliammeter 45, is about 10% (or any desired percentage) higher than necessary to keep the relay contacts open. Then, if the pulse rate, width, or height of the input pulses is reduced by about 10%, the average power to the circuit decreases proportionately and the positive bias on the grid of amplifier 43 is reduced, reducing tube current sufficiently to deenergize relay 47, allowing its contacts to close.

From the foregoing exposition it is obvious that the power sensitive relay circuit depends upon an average bias being maintained on the grid of amplifier 43, thus preventing actuation of an alarm during the period between pulses when the transmitter is resting.

The circuit shown in Fig. 2 is the preferred embodiment. However, a modified circuit with the diode reversed could work as well with negative input pulses, but the modified circuit has the disadvantage that in case of failure of the amplifier the alarm system would be inoperative. The preferred embodiment is more certain in operation because where power to the relay winding is interrupted, as by failure of the amplifier or upon the failure of any stage preceding the amplifier, an alarm will be actuated.

Fig. 3 illustrates graphs of certain wave forms and the sequence of their occurrence. At "A" in Fig. 3 is depicted the main radar trigger which is applied at terminal 1 (Fig. 1) since it is positive. At "B" there is shown the output gate of one-shot multivibrator 5. "C" illustrates the rectangular pulse or "square" gate which is obtained from the output of inverter clippers 8 and 26 and which is utilized to gate gated tubes 9 and 25 respectively. "D" depicts the I. F. signals which are applied at terminal 21 and "E" shows the positive C. R. T. video signals which are applied at terminal 10. At "F" there is shown the output voltage at the plate of gated tubes 9 and 25. It should be noted that the gate is of $t_0$ to $t_5$ microseconds duration and that only those C. R. T. video and I. F. signals occurring during that $t_0$ to $t_5$ microseconds interval appear at the plate of the gated tubes. And finally, "G" depicts the signal obtained from the directional coupler 32.

Fig. 4 depicts a scheme for employing alarm means in the warning system. Each of the alarms 48, 49, 50 may consist of a light, a buzzer, horn, or other suitable means. The alarms are wired in a parallel arrangement and are powered from any suitable source such as battery 57. Alarm 48 is actuated by the closure of contacts 51 which are part of relay 19 (Fig. 1). Similarly, alarm 49 is actuated by closure of contacts 52 of relay 31, and alarm 50 is actuated by closure of contacts 53 of relay 35. Switches 54, 55, and 56 are normally closed and are placed in the circuit to permit their respective alarms to be turned off. Thus, where alarm 48 is actuated, it indicates that video portion of the receiver is defective; where alarm 49 is actuated it indicates that the I. F. or preceding stages of the receiver are defective; where alarm 50 is actuated it indicates that the transmitter is operating inefficiently. Where all three alarms are actuated it indicates that the transmitter is either inoperative or operating at a very low efficiency.

Fig. 5 illustrates an alternate scheme for employing alarm means in the warning system. It should be noted that the scheme of Fig. 5 employs only one alarm 58 which is effectively in series with each of relay contacts 51, 52 and 53 and is otherwise similar to the scheme of Fig. 4. Upon actuation of alarm 58, switches 54, 55 and 56 may be opened in succession to determine in what portion of the radar set the trouble lies.

It will be understood that the particular embodiments of the invention here described have been chosen only by way of example and that numerous modifications of the system components and changes in their combination and arrangement may be resorted to without departing from the spirit and scope of the invention. Therefore, it is intended that the appended claims shall cover any such modifications as fall within the true spirit and scope of the invention.

What is claimed is:

1. A warning system for automatically monitoring the efficiency of a heterodyne-type receiver, comprising, means for generating a gating pulse in response to a trigger pulse, means applying said gating pulse to a first and a second gated tube, means impressing receiver video signals upon the input circuit of said first gated tube, means impressing detected I. F. signals upon the input circuit of said second gated tube, a first diode coupled to the output of said first gated tube, a first integrator coupled to said first diode, a first amplifier responsive to the output of said first integrator, a warning device, a first relay controlled by said first amplifier for actuating said warning device when the output of said first integrator decreases below a predetermined level, a second diode and second integrator serially coupled to said second gated means, a second amplifier responsive to the output of said second integrator, and a second relay controlled by said second amplifier for actuating said warning device when the output of said second integrator decreases below a predetermined level.

2. A warning system for automatically monitoring the efficiency of a radar system having a transmitter and a heterodyne-type receiver, comprising, means for sampling the output of said transmitter, an integrator for integrating the output of said sampler, a warning device, means including a relay responsive to the output of said integrator for actuating said warning device when said integrator output decreases below a predetermined value, means for producing a gating pulse in response to a trigger from said transmitter, said gating pulse being concurrent with a transmitter pulse emission, normally blocked first and second gated tubes adapted to be unblocked by said gated pulse, means impressing receiver video signals upon the input circuit of said first gated tube, first averaging means for averaging the output of said first gated tube, means including a relay responsive to the output of said first averaging means for actuating said warning device upon a decrease beyond a predetermined value of the output from said first averaging means, means impressing detected I. F. signals upon the input circuit of said second gated tube, second averaging means for averaging the output of said second gated tube, and means including a relay responsive to the output of said second averaging means for actuating said warning device when the output of said second averaging means decreases below a predetermined value.

References Cited in the file of this patent

UNITED STATES PATENTS

| | | |
|---|---|---|
| 2,533,898 | Robinson et al. | Dec. 12, 1950 |
| 2,575,799 | Doherty et al. | Nov. 20, 1951 |
| 2,601,472 | Van Weel | June 24, 1952 |
| 2,653,310 | Allen et al. | Sept. 22, 1953 |